(12) United States Patent
An et al.

(10) Patent No.: US 8,175,637 B2
(45) Date of Patent: May 8, 2012

(54) METHOD FOR MULTI-PARTY CALL IN MOBILE STATION

(75) Inventors: Dong Hyuk An, Suwon-si (KR); Eui Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 764 days.

(21) Appl. No.: 12/267,049

(22) Filed: Nov. 7, 2008

(65) Prior Publication Data

US 2009/0137234 A1 May 28, 2009

(30) Foreign Application Priority Data

Nov. 23, 2007 (KR) .................. 10-2007-0120269

(51) Int. Cl.
*H04B 1/38* (2006.01)

(52) U.S. Cl. .................. 455/555; 455/554.1; 455/569.1; 379/308

(58) Field of Classification Search .................. 455/416, 455/555, 554.1, 569.1; 379/210.02, 308, 379/309, 211.01
See application file for complete search history.

(56) References Cited

U.S. PATENT DOCUMENTS

| | | | |
|---|---|---|---|
| 6,434,402 B1 * | 8/2002 | Davison et al. | 455/555 |
| 2010/0091972 A1 * | 4/2010 | Holt et al. | 379/210.02 |

* cited by examiner

*Primary Examiner* — Phuoc Doan
(74) *Attorney, Agent, or Firm* — Jefferson IP Law, LLP (57) ABSTRACT

A method for a multi-party call in a mobile station is provided. The method includes performing a multi-party call and call-connecting, if a mobile station is selected for call connection from mobile stations connected for the multi-party call, to the selected mobile station. Accordingly, a user can reject a call connection request of a third party during communication through a base station. Further, the user can directly select a desired mobile station for call connection or connection release.

19 Claims, 8 Drawing Sheets

METHOD FOR MULTI-PARTY CALL IN MOBILE STATION

PRIORITY

This application claims the benefit under 35 U.S.C. §119 (a) of a Korean patent application filed in the Korean Intellectual Property Office on Nov. 23, 2007 and assigned Serial No. 2007-0120269, the entire disclosure of which is incorporated herein by reference.

BACKGROUND OF THE INVENTION

1. Field of the Invention

The present invention relates to a method for a multi-party call in a mobile station. More particularly, the present invention relates to a method for a multi-party call in a mobile station in which a user can directly select a desired mobile station for call connection or connection release and reject, if call connection is requested, the call connection request.

2. Description of the Related Art

With advances in technology, a synchronous mobile station, for example a Code Division Multiple Access (CDMA) mobile station, is able to provide a multi-party call function and a call waiting function. In the call waiting function, when a first mobile station is communicating with a second mobile station, if a third mobile station requests a call connection with the first mobile station, the first mobile station can communicate with the third mobile station without releasing the connection to the second mobile station.

Figure 1:
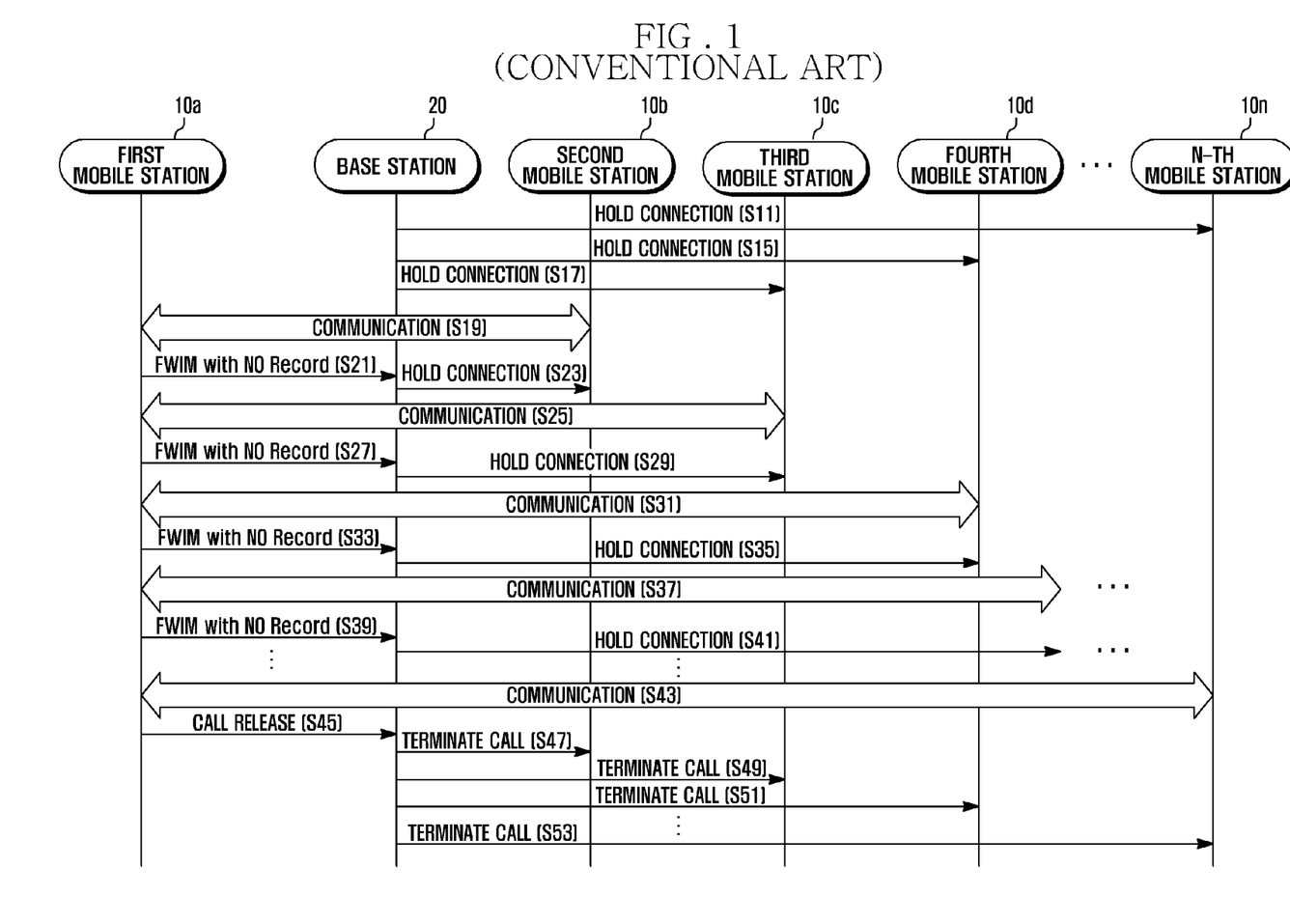
FIG. 1 is a flowchart illustrating a conventional method for a multi-party call in a mobile station.

FIG. 1 is a flowchart illustrating a conventional method for a multi-party call in a mobile station. Hereinafter, an operation of a typical synchronous mobile station for performing a call waiting function is described referring to FIG. 1.

A first mobile station 10a performs a multi-party call with a second mobile station 10b, a third mobile station 10c, a fourth mobile station 10d and an n-th mobile station 10n through a base station 20. In particular, the first mobile station 10a, through the base station 20, holds a connection to the n-th mobile station 10n in step S11, the fourth mobile station 10d in step S15, and the third mobile station 10c in step S17 and communicates with the second mobile station 10b in step S19.

To connect a call between the first mobile station 10a and the n-th mobile station 10n, a user of the first mobile station 10a inputs a send key. Upon input of the send key, the first mobile station 10a transmits a 'Flash With Information Message (FWIM) with No Record' message to the base station 20 to request that the call connection with the mobile station with which it is currently communicating, that is, the second mobile station 10b, be put on hold in step S21. The base station 20 then holds the connection to the second mobile station 10b in step S23 and connects the first mobile station 10a to the third mobile station 10c in step S25. The FWIM is a transmitting and receiving message between a mobile station and a base station and includes information for a mobile communication service.

Since the connected third mobile station 10c is not the desired n-th mobile station 10n, the user inputs the send key again to transmit an 'FWIM with No Record' message to the base station 20 which requests that the call connection with the third mobile station 10c be put on hold in step S27. Thereafter, the base station 20 holds the connection to the third mobile station 10c in step S29 and connects the first mobile station 10a to the fourth mobile station 10d in step S31.

Next, since the connected fourth mobile station 10d is not the n-th mobile station 10n, the user inputs the send key again to transmit an 'FWIM with No Record' message to the base station 20 which requests that the call connection with the fourth mobile station 10d be put on hold in step S33. Thereafter, the base station 20 holds the connection to the fourth mobile station 10d in step S35 and connects the first mobile station 10a to another mobile station in step S37.

For connection to the n-th mobile station 10n, the first mobile station 10a repeatedly transmits an 'FWIM with No Record' message to the base station 20 in step S39 and the base station 20 holds the connection to the previously connected mobile station in step S41. By repeating this process, the first mobile station 10a connects to the n-th mobile station 10n in step S43.

In the above description, the first mobile station is sequentially connected to the second through n-th mobile stations according to the repeated input of a send key for requesting call connection to another specific mobile station. However, the base station actually connects the first mobile station to a mobile station among the waiting mobile stations.

In order to perform a connection release operation by the first mobile station 10a, an end key for releasing call connection is input by which the first mobile station 10a requests connection release from the base station 20 in step S45. The base station 20 sequentially terminates the connection to the second through n-th mobile stations 10b, 10c, 10d and 10n that are connected to the first mobile station 10a in steps S47, S49, S51 and S53, respectively.

As described above, in order to connect to a desired mobile station, a user repeatedly inputs a send key while a base station randomly searches for connection to the desired mobile station, until the base station finds the desired mobile station.

Further, in the case that the user of the first mobile station intends to release its connection to a desired mobile station, the user cannot selectively release connection to only the desired mobile station but releases connection to all connected mobile stations.

When a third mobile station requests call connection to the first mobile station while the first mobile station communicates with a second mobile station, the first mobile station can reject the call connection request if the first mobile station does not want to communicate with the third mobile station. In this case, the first mobile station may reject and ignore the call connection request of the third mobile station. However, the first mobile station does not inform the third mobile station of the rejection. That is, the first mobile station does not transmit a rejection message and does not perform a release connection to the third mobile station. Therefore, the user must wait while listening to a ring tone until the third mobile station automatically terminates the connection attempt. Accordingly, an improved method for making a multi-party call is needed.

SUMMARY OF THE INVENTION

An aspect of the present invention is to address at least the above-mentioned problems and/or disadvantages and to provide at least the advantages described below. Accordingly, an aspect of the present invention is to provide a method for a multi-party call in a mobile station in which a user can select a desired mobile station for call connection during a multi-party call.

Another aspect of the present invention is to provide a method for a multi-party call in a mobile station in which a user can select a desired mobile station for connection release during a multi-party call.

A further aspect of the present invention is to provide a method for a multi-party call in a mobile station in which a user can reject, if a third party requests call connection during communication, the call connection request through a base station.

In accordance with an aspect of the present invention, a method for a multi-party call in a mobile station is provided. The method includes performing a multi-party call and if a first mobile station is selected for call connection from among a plurality of mobile stations connected for the multi-party call, connecting to the selected first mobile station.

According to an exemplary implementation of the present invention, a user can reject a call connection request of a third party through a base station during communication. Thus, a traffic channel allocated to the third party can be terminated, thereby enhancing efficiency of a network resource.

According to a further exemplary implementation of the present invention, a user can directly select a desired mobile station for call connection or connection release without multiple key inputs for selection of the desired mobile station for call connection and connection release, thereby enhancing user convenience.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, detailed descriptions of well-known functions and constructions are omitted for clarity and conciseness.

In the exemplary embodiments hereinafter described, a CDMA mobile station is used to help explain the present invention. However, the invention is not limited thereto. Rather, the exemplary embodiments of the invention may be applied to other types of synchronous mobile stations, such as an International Mobile Telecommunication 2000 (IMT-2000) terminal or a CDMA2000 terminal.

Figure 2:
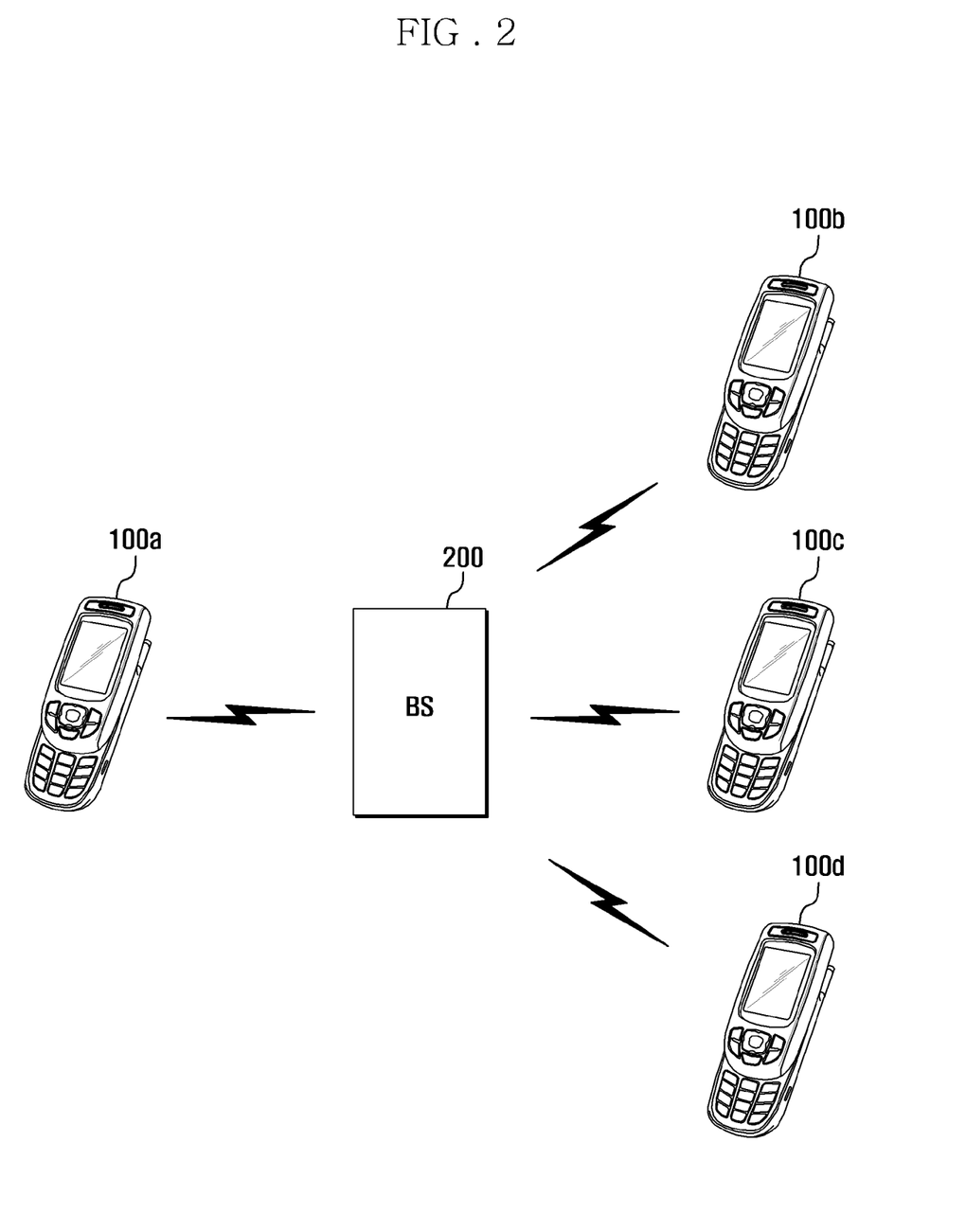
FIG. 2 is a schematic diagram illustrating a communication process between a mobile station and a base station for a multi-party call according to an exemplary embodiment of the present invention.

FIG. 2 is a schematic diagram illustrating a communication process between a mobile station and a base station for a multi-party call according to an exemplary embodiment of the present invention.

Referring to FIG. 2, a multi-party call system comprises a first Mobile Station (MS) 100a, a second MS 100b, a third MS 100c, a fourth MS 100d, and a Base Station (BS) 200.

The first MS 100a performs a multi-party call with the second to fourth MSs 100b, 100c and 100d through the BS 200. For example, when either or both of the third and fourth MSs 100c and 100d request call connection to the first MS 100a while the first MS 100a is communicating with the second MS 100b, the first MS 100a may accept the call connection request and perform a multi-party call. Further, the first MS 100a may request call connection to either or both of the third and fourth MSs 100c and 100d while the first MS 100a is communicating with the second MS 100b to thereby perform a multi-party call.

During a multi-party call, only a one-to-one call connection is possible between MSs. That is, other MSs that are connected during a one-to-one call enter a call waiting or hold state. For example, in FIG. 2, while the first to fourth MSs 100a, 100b, 100c and 100d are connected for a multi-party call, when the first MS 100a is communicating with the second MS 100b, the third and fourth MSs 100c and 100d are in the call waiting state. In this state, if the first MS 100a desires to communicate with the fourth MS 100d, the first MS 100a requests the BS 200 to connect it to the fourth MS 100d. Based on the request from the first MS 100a, the BS 200 puts the second MS 100b that is currently communicating with the first MS 100a on hold and connects the first MS 100a to the fourth MS 100d.

Figure 3:
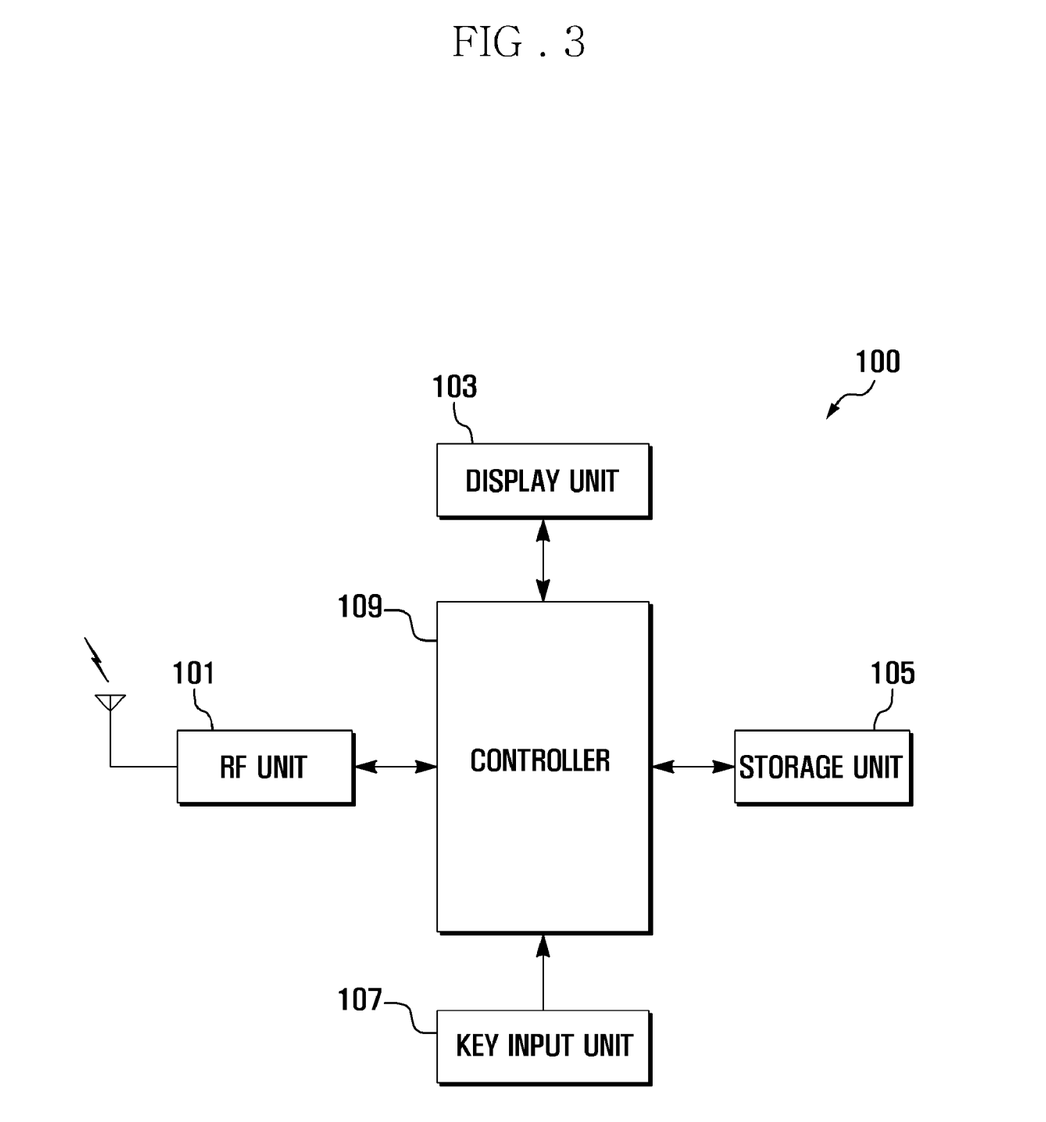
FIG. 3 is a block diagram illustrating a mobile station for a multi-party call according to an exemplary embodiment of the present invention.

Hereinafter, an MS for a multi-party call according to an exemplary embodiment of the present invention is described in more detail. FIG. 3 is a block diagram illustrating an MS for a multi-party call according to an exemplary embodiment of the present invention.

Referring to FIG. 3, a synchronous MS 100 includes an RF unit 101, a display unit 103, a storage unit 105, a key input unit 107 and a controller 109.

The RF unit 101 performs a wireless communication function of the MS 100. The RF unit 101 includes an RF transmitter for up-converting a frequency and amplifying a transmission signal, and an RF receiver for low noise amplifying a received signal and down-converting a frequency thereof. In an exemplary implementation, the RF unit 101 performs a multi-party call with a plurality of MSs through the BS 200.

The display unit 103 displays information on operations of the MS 100. If a third party requests call connection during a one-to-one call, the display unit 103 may display the request, for example as a pop-up window, so that a user can select to accept or reject the call. In a case that the user wants to connect to an MS or release connection to an MS during a multi-party call, the display unit 103 may display a list of the MSs that are part of the multi-party call. The display unit 103 may be provided as a Liquid Crystal Display (LCD). In this case, the display unit 103 may include a controller for controlling the LCD, a video memory in which image data is stored and an LCD element. If the LCD is provided as a touch screen, the display unit 103 may perform a part or all of the functions of the key input unit 107, described below.

The memory unit 105 stores programs and information for operations of the MS 100. The memory unit 105 may store information about MSs connected in a multi-party call, for example MS phone numbers and corresponding user names. More specifically, the memory unit 105 may store information about the MSs that are connected in a multi-party call as a list and display the listed information in the display unit 103 when a user requests the information.

The memory unit 105 may store a program in which a 'Release numbering plan' is transmitted to the BS 200 if an MS is selected for connection release and a 'Select numbering plan' is transmitted to the BS 200 if an MS is selected for call connection. The 'Release numbering plan' and the 'Select numbering plan' are described in more detail hereinafter.

As described above, a Flash With Information Message (FWIM) is a message transmitted and received between the MS 100 and the BS 200 that includes information for mobile communication service. A 'Connected Number' is a record type that may be transmitted through the FWIM. The 'Connected Number' record type configuration is shown in Table 1.

TABLE 1

| Type-Specific Field | Length(bits) |
| --- | --- |
| NUMBER_TYPE | 3 |
| NUMBER_PLAN | 4 |
| PI | 2 |
| SI | 2 |
| Zero or more occurrences of the following field: { | |
| CHARi | 8 |
| } | |
| RESEARVED | 5 |

As shown in Table 1, the 'Connected Number' record type has a specific field called 'NUMBER_PLAN'. The 'NUMBER_PLAN' field may be displayed as a number plan identification table, as shown in Table 2.

TABLE 2

| Description | NUMBER_PLAN(binary) |
| --- | --- |
| Unknown | 0000 |
| ISDN/Telephony numbering plan (CCITT E.164 AND CCITT E.163) | 0001 |
| Data numbering plan (CCITT X.121) | 0011 |
| Telex numbering plan (CCITT F.69) | 0100 |
| Private numbering plan | 1001 |
| Select numbering plan | 1010 |
| Release numbering plan | 1011 |
| Reserved for extension | 1111 |

All other NUMBER_PLAN codes are reserved

As shown in Table 2, a 'Reserved' item for extension exists in the number plan identification, and 'Select numbering plan' and 'Release numbering plan' items are added between 'Private numbering plan' and 'Reserved for extension' items of the 'NUMBER_PLAN'. That is, between the 4 bit binary numbers 1001 and 1111, specific binary numbers are set as the corresponding plans to be added. Table 2 exemplifies the 'Select numbering plan' as the binary number 1010 and the 'Release numbering plan' as the binary number 1011, but this is merely for example and the invention is not limited thereto.

The key input unit 107 receives an operation signal from a user for controlling operations of the MS 100. For example, the key input unit 107 may receive signals input by the user to perform a call connection request, to perform an acceptance or rejection of a call connection request during a one-to-one call, to perform call connection or connection release to a specified MS during a multi-party call and the like.

The controller 109 controls operations of units of the MS 100 and controls a multi-party call function. For example, if a third MS 100c requests call connection while the MS 100 communicates with a second MS 100b, the controller 109 of the MS 100 may accept or reject the call connection request to the third MS 100c. If the controller 109 accepts the call connection request, the controller 109 places the call connection to the second MS 100b that is currently communicating with the MS 100 on hold and performs a call connection to the third MS 100c. If the controller 109 rejects the call connection request, the controller 109 transmits a rejection message, that is, an FWIM with 'Release numbering plan 1011' and an MS3 number digit as identification of the third MS 100c to the BS 200. Here, the 'Release numbering plan 1011' is the 'Release numbering plan' having the binary number 1011 as described referring to Table 2, and 'MS3' refers to the third MS 100c.

Further, when the MS 100 communicates with the second MS 100b while the MS 100 is connected to the second to n-th MSs 100b, 100c, 100d and 100n during a multi-party call, the controller 109 of the MS 100 may select another of the connected MSs for call connection. For example, the MS 100 may select the fourth MS 100d for call connection by transmitting an FWIM with 'Select numbering plan 1010' and an MS4 number digit as identification of the fourth MS 100d to the BS 200. Here, the 'Select numbering plan 1010' is as described referring to Table 2. Then, the controller 109 of the MS 100 places the call connection to the second MS 100b that is currently communicating with the MS 100 on hold and performs a call connection to the fourth MS 100d.

Further, when the MS 100 communicates with the second MS 100b while the MS 100 is connected to the second to n-th MSs 10b, 100c, 100d and 100n for a multi-party call, the controller 109 of the MS 100 may select a specific MS for connection release. For example, the first MS 100 may select the fourth MS 100d for connection release by transmitting an FWIM with 'Release numbering plan 1011' and an MS4 number digit to the BS 200. Then, the controller 109 of the MS 100 releases its connection to the fourth MS 100d that is connected for a multi-party call. In an exemplary implementation, the controller 109 may select a plurality of MSs for connection release.

Further, the controller 109 of the MS 100 may request call connection to the n-th MS 100n and connection release to the second MS 100b by transmitting an FWIM with 'Release numbering plan 1011' and an MS2 number digit, and an FWIM with 'Select numbering plan 1010' and an MSn number digit, to the BS 200. Then, the controller 109 of the MS 100 releases the connection to the second MS 100b and performs call connection to the n-th MS 100n.

Figure 4A:
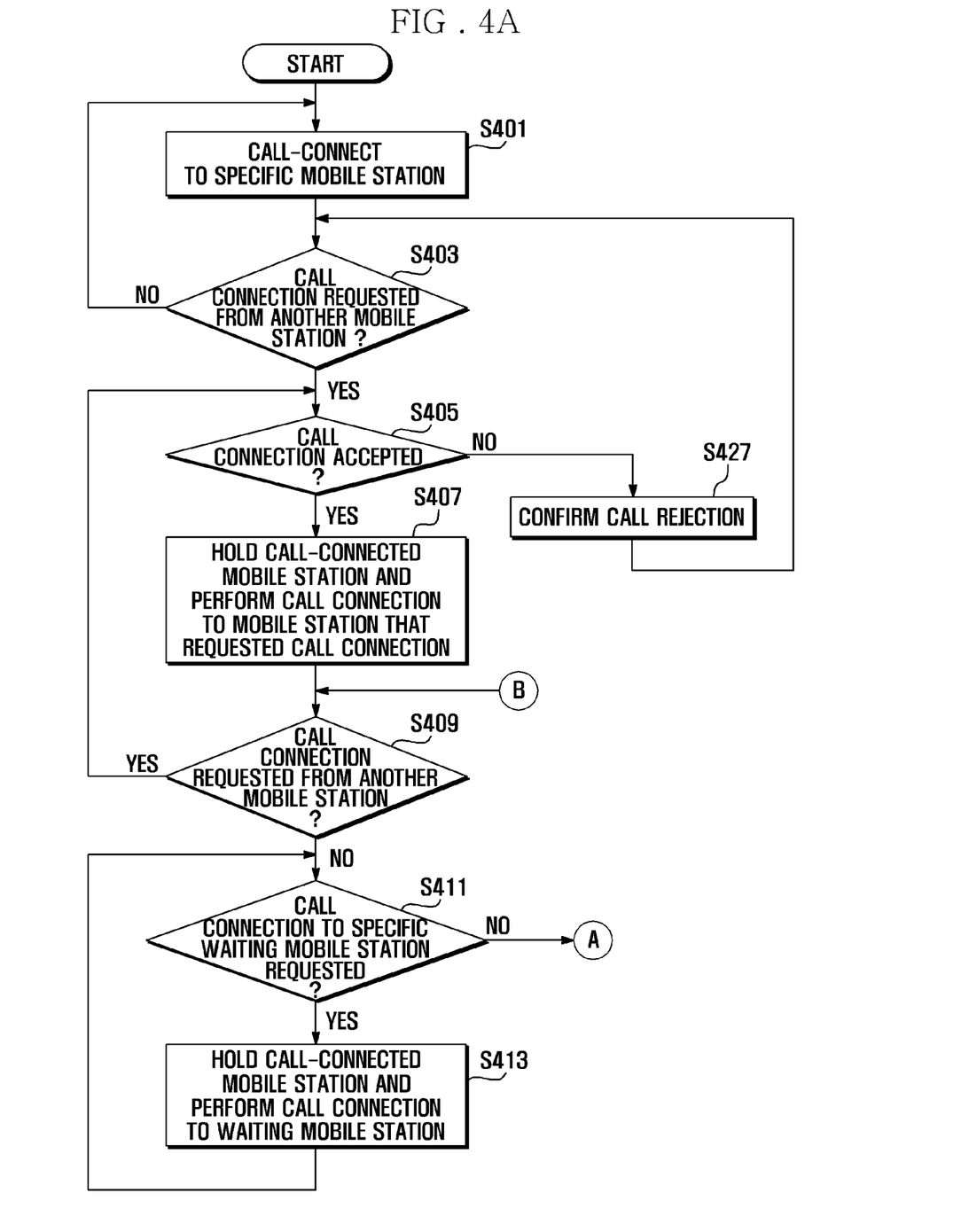
FIGS. 4A and 4B are flowcharts illustrating a method for a multi-party call in a mobile station according to an exemplary embodiment of the present invention.
Figure 4B:
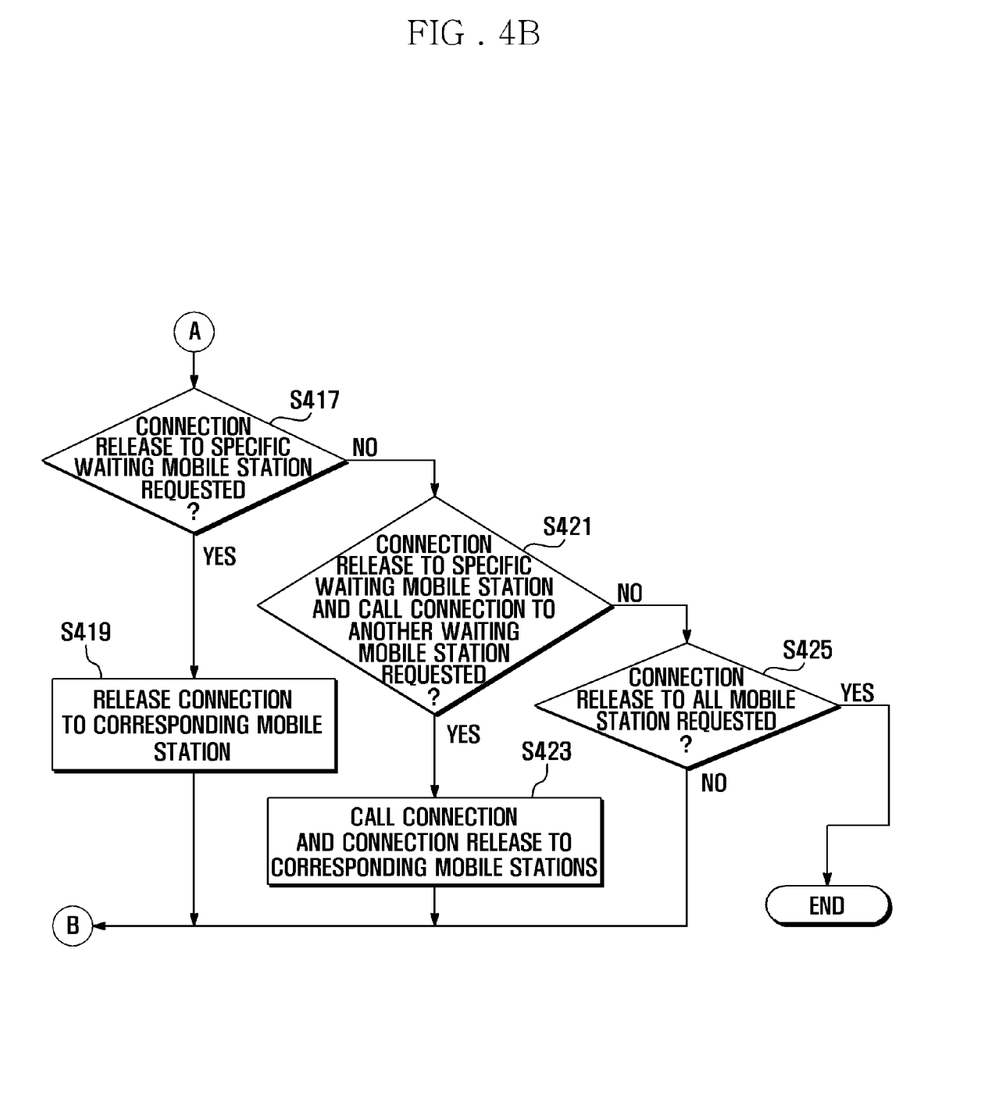

Hereinafter, an exemplary method for a multi-party call in an MS is described in more detail. FIGS. 4A and 4B are flowcharts illustrating an exemplary method for a multi-party call in an MS according to an exemplary embodiment of the present invention.

Referring to FIGS. 4A and 4B, the controller 109 performs call connection to a specific MS in step S401 so that the MS 100 communicates with the specific MS on a one-to-one basis. For example, the controller 109 may perform a call connection to the second MS 100*b* so that the MS 100 communicates with the second MS 100*b* on a one-to-one basis.

The controller 109 determines whether another MS, for example the third MS 100*c*, requests call connection to the MS 100 in step S403. In an exemplary implementation, the controller 109 also determines whether the MS 100 requests call connection to the third MS 100*c*.

If the third MS 100*c* requests call connection, the controller 109 determines whether the call connection is accepted in step S405. The MS 100 may accept or reject the call connection request from the third MS 100*c* during the one-to-one communication with the second MS 100*b*.

If the call connection request is rejected, the controller 109 provides confirmation of the rejection to the third MS 100*c* in step S427, and the process returns to step S403. That is, the MS 100 transmits a rejection message to the BS 200 and the BS 200 informs the third MS 100*c* of connection release and terminates a traffic channel.

If call connection is accepted at step S405, the controller 109 places the call-connected MS on hold and performs call connection to the MS that requested the call connection in step S407. In this example, the MS 100 places the call connection to the second MS 100*b* on hold and connects to the third MS 100*c*. Thus, a multi-party call is performed.

Next, the controller 109 determines whether call connection is requested from another MS in step S409. That is, the MS 100 continuously determines whether call connection for a multi-party call is requested from the fourth to n-th MSs 100*d* to 100*n*. As in step S403, the controller 109 also determines whether the MS 100 requests call connection to another MS. If call connection is requested, the process returns to step S405 and the controller 109 determines whether the call connection is accepted.

If call connection is not requested at step S409, the controller 109 determines whether call connection to a specific waiting MS is requested in step S411. As an example, it is assumed that the MS 100 performs a multi-party call with the second to n-th MSs 100*b*, 100*c*, 100*d* and 100*n*. Further to the example, it is assumed that the MS 100 communicates with the third MS 100*c* from step S407, and the second MS 100*b* and fourth to n-th MSs 100*d* and 100*n* are on hold waiting for direct connection. The MS 100 may select any of the MSs that are waiting to connect.

If connection to a specific waiting MS is requested at step S411, the controller 109 places the call-connected MS on hold and connects to the specific waiting MS in step S413. In the example, the MS 100 places the call-connected third MS 100*c* on hold and connects to, for example, the fourth MS 100*d*.

The process then returns to step S411 and the controller 109 again determines whether call connection to any other of the waiting MSs is requested at step S411. That is, the MS 100 repeatedly determines whether call connection to a specific MS among the waiting second, third and n-th MSs 100*b*, 100*c* and 100*n* is requested at steps S411 and S413.

If call connection is not requested at step S411, the controller 109 determines whether connection release to a specific MS is requested in step S417. In the example, the MS 100 confirms whether connection release to a specific MS among the waiting second, third and n-th MSs 100*b*, 100*c* and 100*n* is requested during communication with the fourth MS 100*d*.

If connection release to a specific waiting MS is requested, the controller 109 performs connection release to the corresponding MS in step S419. For example, if the waiting second MS 100*b* is selected for connection release, the MS 100 releases the connection to the second MS 100*b*. At step S417, the MS 100 may also request connection release to a call-connected MS, that is, to the fourth MS 100*d* with which the MS 100 is currently communicating. In this case, the controller 109 performs connection release to the fourth MS 100*d* and the BS 200 call-connects the MS 100 to another MS among the waiting MSs 100*b*, 100*c* and 100*n*.

If connection release to a specific MS is not requested at step S417, the controller 109 determines whether connection release to a specific waiting MS and call connection to another specific waiting MS are requested in step S421. That is, the controller 109 confirms whether specific MSs are selected for call connection and connection release.

If specific MSs are selected for call connection and connection release at step S421, the controller 109 performs call connection and connection release to the corresponding MSs in step S423. For example, the MS 100 selects the second MS 100*b* for connection release and selects the n-th MS 100*n* for call connection. The MS 100 then releases the connection to the second MS 100*b* and call-connects to the n-th MS 100*n*. Here, a plurality of MSs may be selected for connection release.

If call connection and connection release to specific MSs are not requested at step S421, the controller 109 confirms whether connection release to all MSs is requested in step S425. That is, the MS 100 may request connection release to all MSs 100*b*, 100*c*, 100*d* and 100*n*. If connection release to all MSs connected for a multi-party call is requested, the controller 109 releases the connection to all MSs and terminates the multi-party call function.

Figure 5:
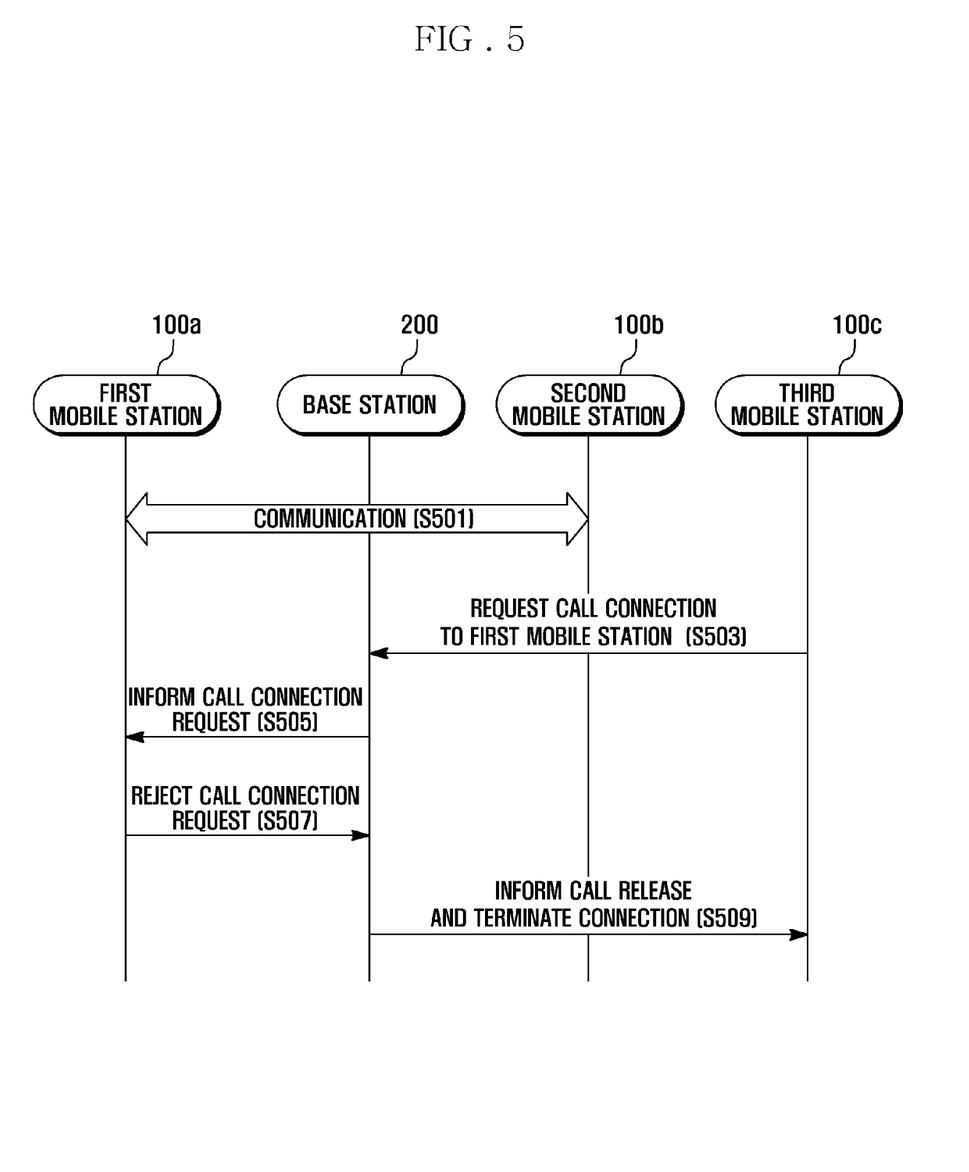
FIG. 5 is a flowchart illustrating an exemplary multi-party call process when another mobile station requests call connection during a one-to-one call in a mobile station in the method of FIGS. 4A and 4B.

FIG. 5 is a flowchart illustrating an exemplary multi-party call process when another MS requests call connection during a one-to-one call in a MS in the method of FIGS. 4A and 4B.

Referring to FIG. 5, the first MS 100*a* performs a one-to-one call with the second MS 100*b* in step S501. Then, the third MS 100*c* requests the BS 200 for connection to the first MS 100*a* in step S503.

The BS 200 receives the call connection request from the third MS 100*c*, and informs the first MS 100*a* using an FWIM with a calling party number and an MS1 number digit in step S505. In an exemplary implementation, a pop-up window for selecting call connection acceptance or rejection together with the number of the third MS 100*c* that requested the call connection is displayed in a display unit of the first MS 100*a*.

If the first MS 100*a* selects to reject the call connection request, the first MS 100*a* transmits an FWIM with 'Release numbering plan 1011' and an MS3 number digit for rejecting the call connection request from the third MS 100*c* to the BS 200 in step S507.

The BS 200 informs the third MS 100*c* of connection release and terminates the connection in step S509. In the conventional method, the third MS 100*c* is not informed of a call connection request rejection from the first MS 100*a*. However, according to an exemplary embodiment of the present invention, the third MS 100*c* receives a rejection message from the BS 200, and can thereby recognize call connection request rejection.

Figure 6:
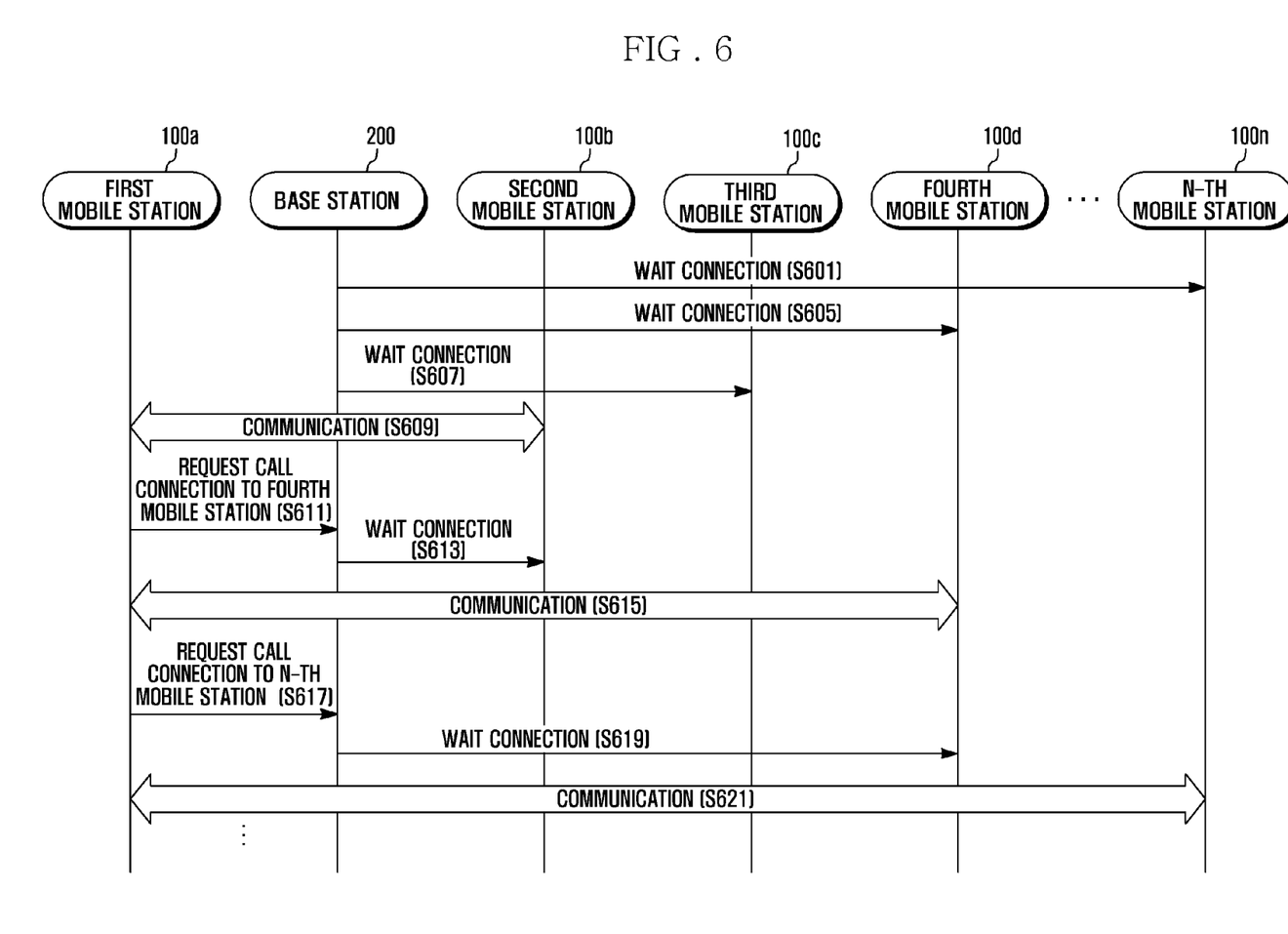
FIG. 6 is a flowchart illustrating an exemplary process for selective call connection during a multi-party call in a mobile station in the method of FIGS. 4A and 4B.

FIG. 6 is a flowchart illustrating an exemplary process for selective call connection during a multi-party call in an MS in the method of FIGS. 4A and 4B.

Referring to FIG. 6, the first MS 100a, which is connected to the second to n-th MSs 100b, 100c, 100d and 100n for a multi-party call, places the n-th to third MSs 100n, 100d and 100c on hold in steps S601, S605 and S607, respectively and performs a call with the second MS 100b in step S609.

The first MS 100a selects a desired MS for call connection, for example the fourth MS 100d, from a displayed list of MSs for a multi-party call, and requests the BS 200 for connection to the fourth MS 100d in step S611. That is, the MS 100 requests the BS 200 to call-connect to the selected waiting fourth MS 100d using an FWIM with 'Select numbering plan 1010' and an MS4 number digit.

The BS 200 then places the second MS 100b that is currently communicating with MS 100a on hold in step S613 and connects the first MS 100a to the selected fourth MS 100d in step S615.

In order to select another desired MS, for example the n-th MS 100n, the first MS 100a requests the BS 200 for connection to the selected waiting n-th MS 100n in step S617. The BS 200 then places the fourth MS 100d that is currently communicating with MS 100a on hold in step S619 and connects the first MS 100a to the selected n-th MS 100n in step S621.

Figure 7:
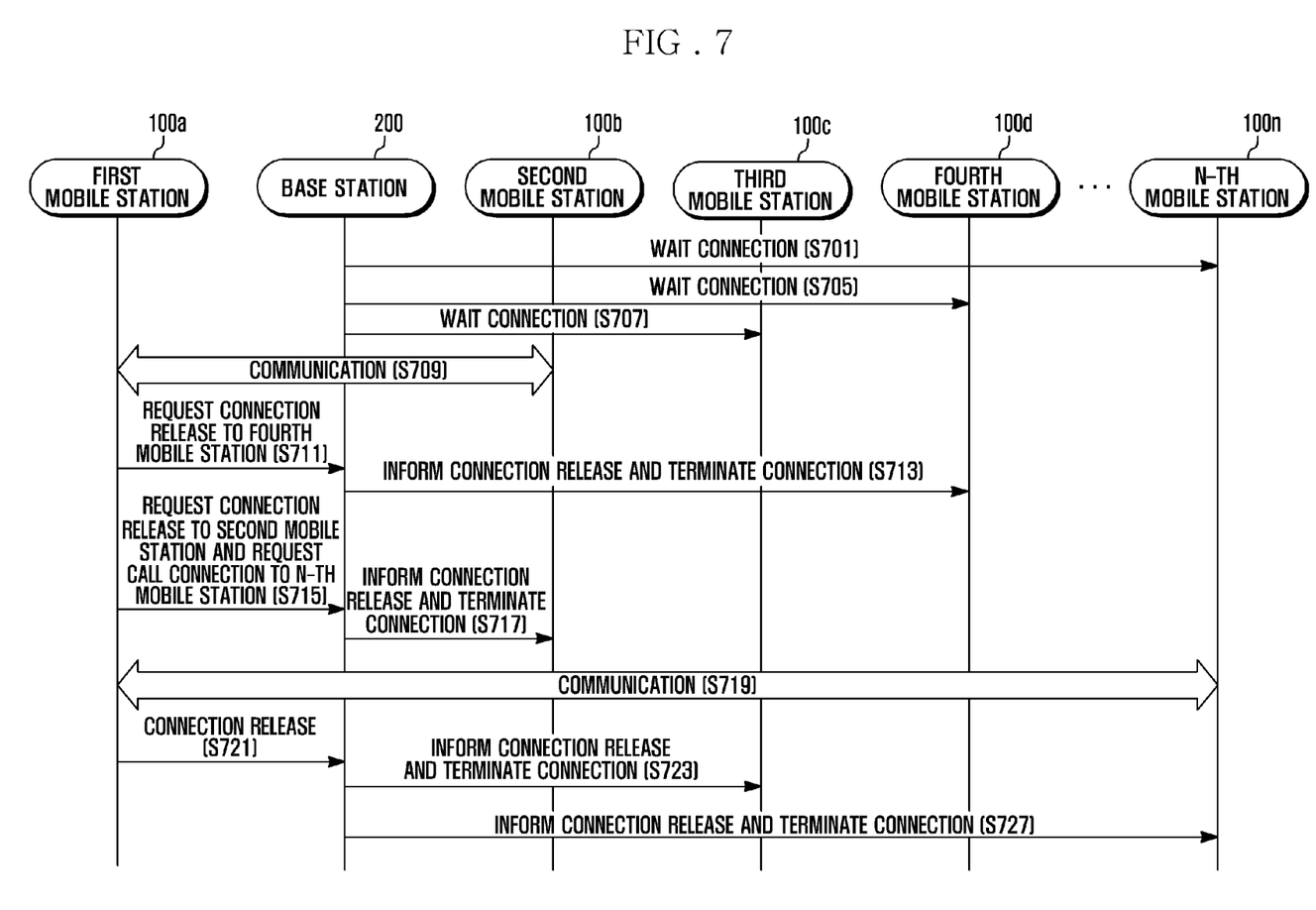
FIG. 7 is a flowchart illustrating an exemplary process for selective connection release during a multi-party call in a mobile station in the method of FIGS. 4A and 4B.

FIG. 7 is a flowchart illustrating an exemplary process for selective connection release during a multi-party call in an MS in the method of FIGS. 4A and 4B.

Referring to FIG. 7, the first MS 100a, which is connected to the second to n-th MSs 100b, 100c, 100d and 100n for a multi-party call, places the n-th to third MSs 100n, 100d and 100c on hold in steps S701, S705 and S707, respectively and performs a call with the second MS 100b in step S709.

The first MS 100a selects a desired MS for connection release, for example the fourth MS 100d, from a displayed list of MSs that are part of a multi-party call, and transmits a message to the BS 200 requesting connection release to the selected waiting fourth MS 100d in step S711.

Then, the BS 200 informs the selected fourth MS 100d of the connection release and terminates the connection in step S713.

Next, the first MS 100a selects the second MS 100b for connection release and the n-th MS 100n for call connection from a displayed list of MSs on a multi-party call. Accordingly, the first MS 100a transmits a message to the BS 200 requesting connection release to the selected second MS 100b with which it is currently communicating and call connection to the selected waiting n-th MS 100n in step S715.

The BS 200 informs the second MS 100b of connection release and terminates the connection in step S717. The BS connects the first MS 100a to the n-th MS 100n in step S719.

Then, the first MS 100a transmits a message to the BS 200 requesting connection release to all MSs connected for a multi-party call (that is, the fourth MS 100d and the n-th MS 100n) in step S721. The BS 200 informs the connected fourth MS 100d and the n-th MS 100n of the connection release and terminates the connection in steps S723 and S727, respectively.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims and their equivalents.

What is claimed is:

1. A method for a multi-party call in a mobile station, the method comprising:
   performing a multi-party call; and
   if a first mobile station is selected for call connection from among a plurality of mobile stations connected for the multi-party call, connecting to the selected first mobile station,
   wherein the connecting to the selected first mobile station comprises:
   holding a connection to a mobile station that is currently communicating; and
   connecting to the first mobile station.

2. The method according to claim 1, wherein the performing of the multi-party call comprises storing information on the plurality of mobile stations connected for the multi-party call.

3. The method according to claim 2, wherein the connecting to the selected first mobile station further comprises transmitting a 'Select numbering plan' to a base station.

4. The method according to claim 3, wherein the 'Select numbering plan' is added to a numbering plan identification of a 'NUMBER_PLAN' field of a 'Connected Number' record type in an Flash With Information Message (FWIM) transmitted between the mobile station and the base station.

5. The method according to claim 1, further comprising:
   transmitting, if a second mobile station is selected for connection release from among the plurality of mobile stations connected for the multi-party call, a 'Release numbering plan' to a base station; and
   releasing the connection to the selected second mobile station.

6. The method according to claim 5, wherein the 'Release numbering plan' is added to a numbering plan identification of a 'NUMBER_PLAN' field of a 'Connected Number' record type in an FWIM transmitted between the mobile station and the base station.

7. The method according to claim 5, wherein the connecting to the selected first mobile station comprises:
   transmitting, if a mobile station that is currently communicating is selected for connection release, the 'Release numbering plan' to the base station;
   releasing the connection to the mobile station that is currently communicating; and
   connecting the first mobile station that is selected for call connection.

8. The method according to claim 5, wherein the performing of the multi-party call comprises:
   determining whether, during call connection to a mobile station, another mobile station requests call connection;
   selecting, if the another mobile station requests call connection, one of connection release and holding call connection;
   transmitting, if connection release is selected, the 'Release numbering plan' to the base station; and
   holding, if holding call connection is selected, call connection to the mobile station that is currently communicating, and call-connecting to the mobile station requesting call connection.

9. The method according to claim 8, wherein the selecting of the connection release comprises releasing connection to the mobile station that requests call connection by the base station.

10. The method according to claim 1, further comprising:
    transmitting, if a second mobile station is selected for call connection and a third mobile station is selected for connection release from among the plurality of mobile stations connected for the multi-party call, a 'Select numbering plan' and a 'Release numbering plan' to a base station; and call-connecting and releasing connection to the second and third mobile stations respectively.

11. A method for a multi-party call in a mobile station, the method comprising:
   establishing a connection to each of a plurality of mobile stations by call-connecting to a first of the plurality of mobile stations and placing the remaining mobile stations on hold;
   receiving a request to call-connect to a second of the plurality of mobile stations; and
   placing the first mobile station on hold and call-connecting to the second mobile station.

12. The method of claim 11, further comprising:
   receiving a request for connection release to a third of the plurality of mobile stations; and
   releasing the connection to the third mobile station.

13. The method of claim 11, further comprising:
   receiving a request for call-connection to a fourth of the plurality of mobile stations; and
   connecting to the fourth mobile station after releasing the call-connection to the second mobile station.

14. The method of claim 13, wherein the receiving of the request for call-connection to the fourth mobile station comprises receiving the request from the fourth mobile station.

15. The method of claim 11, further comprising:
   receiving a call-connection request from a fifth mobile station;
   determining if the call-connection request from the fifth mobile station is accepted; and
   placing the second mobile station on hold and call-connecting to the fifth mobile station if the call-connection request from the fifth mobile station is accepted.

16. The method of claim 15, wherein if the call connection request from the fifth mobile station is not accepted, informing the fifth mobile station of the result.

17. The method of claim 16, wherein the informing of the fifth mobile station of the result comprises transmitting a rejection message to the fifth mobile station.

18. An apparatus for conducting a multi-party call in a mobile station, the apparatus comprising:
   a controller for performing a multi-party call,
   wherein, if a first mobile station is selected for call connection from among a plurality of mobile stations connected for the multi-party call, the controller connects the mobile station to the selected first mobile station,
   wherein the controller connects the mobile station to the selected first mobile station by holding a connection to a mobile station that is currently communicating, and connecting to the first mobile station.

19. The apparatus of claim 18, wherein the controller connects the mobile station to the selected first mobile station by transmitting a 'Select number plan' to a base station.

* * * * *